United States Patent [19]
Loy

[11] Patent Number: 4,674,826
[45] Date of Patent: Jun. 23, 1987

[54] OPTICO-MECHANICAL SCANNING DEVICE

[75] Inventor: Fernand R. Loy, Sceaux, France

[73] Assignee: Telecommunications Radioelectriques et Telephoniques-TRT, Paris, France

[21] Appl. No.: 81,161

[22] Filed: Oct. 5, 1979

[30] Foreign Application Priority Data

Nov. 6, 1978 [FR] France ............................. 78 31352

[51] Int. Cl.⁴ ...................... G02B 26/08; G02B 26/10
[52] U.S. Cl. ...................................... 350/6.8; 250/334; 358/113
[58] Field of Search ................. 350/6.6, 6.7, 6.8, 6.9; 358/113; 250/334

[56] References Cited

U.S. PATENT DOCUMENTS

| | | | |
|---|---|---|---|
| 2,070,460 | 2/1937 | Traub | 350/6.9 |
| 3,817,593 | 6/1974 | Harris et al. | 350/299 |
| 3,829,192 | 8/1974 | Wheeler | 350/285 |
| 3,912,927 | 10/1975 | Hoffman, II | 250/234 |
| 4,082,417 | 4/1978 | Runeiman et al. | 350/6.8 |

FOREIGN PATENT DOCUMENTS

7808370 3/1979 Netherlands ........................ 350/6.8

*Primary Examiner*—Stephen C. Buczinski
*Attorney, Agent, or Firm*—Stevens, Davis, Miller & Mosher

[57] ABSTRACT

The invention relates to a device for optically scanning a field of vision divided into different regions and for displaying the field, scanning being done in two perpendicular directions, i.e. "line" scanning in a direction x and "raster" or "image" scanning in a direction y, the device scanning along beams coming from different regions of the field and causing the beams to converge on to an element sensitive to the radiation in the beams, the present invention being concerned particularly with the line-scanning means, which is designed so that the device can operate with smaller apertures without affecting its resolution. The line-scanning system comprises a rotating drum having reflecting surfaces but the detector image is conveyed outside the drum axis. The analyzed line is an arc of a circle but is centered outside the drum axis and its length is greater than before whereas the aperture of the line analysis system is smaller so that if the system of analysis has a given geometrical size, the number of points of analysis in the line is at least preserved. Consequently, the device can be constructed with a smaller aperture—i.e. F/4 instead of F/2—resulting in greater tolerance in faults in the focusing of the raster mirror.

20 Claims, 9 Drawing Figures

ENLARGEMENT γ

OPTICO-MECHANICAL SCANNING DEVICE

The invention relates to an improvement to devices for optically scanning a field of vision and displaying the field. More specifically, the invention relates to the scanning-line part of the devices and also to novel components of the aforementioned devices which are more adapted to the novel system of line analysis.

The devices for optically scanning a field of vision and displaying the field are already described in the continuation in part application filed by the applicant on Sept. 12, 1977 under Ser. No. 859,997.

The aforementioned application relates to a device for optically scanning a field of vision divided into different regions and for displaying the field, scanning being made in two perpendicular directions, i.e. "line" scanning in a direction x and "raster" or "image" scanning in a direction y, the device scanning along beams coming from different regions of the field and causing the beams to converge on to an element (or detector) sensitive to the radiation in the beams, the device substantially comprising the following components in order, in the direction of the path of the central incident beam from the field of vision: an objective, means for raster scanning in the y direction, and a system for bending the beams bounded by the sensitive element and the aperture of the objective toward means for line scanning of the image field of the objective in the x direction, the line scanning means, the sensitive element and any other elements cooperating with the previously-mentioned elements being used for direct display of the image of the analyzed field, the device being characterized in that:

the optical axis of the objective is in a plane P containing the y direction and perpendicular to x, the objective being interchangeable and its focal surface being curved and such that its centre of curvature is at the centre of the exit pupil of the objective, the raster scannng means comprise a plane mirror rotating in reciprocation around an axis parallel to the x direction and disposed in a convergent beam behind the objective near the field image in the objective, the line scanning means comprise, firstly, a drum rotating uniformly around a stationary axis YY', contained in the plane P and bearing a large number of flat reflecting surfaces regularly distributed on the drum periphery and, secondly, an image-conveying means symmetrical with respect to the plane P and forming an image of the sensitive element at a fixed point A' along the drum rotation axis YY', the drum being placed in a convergent beam in the path of the conveying system on the image side of the sensitive element, the point symmetrical with the point A' with respect to each surface of the drum, when the surface is perpendicular to the plane P, being in the neighbourhood of that point D which is symmetrical with the focus of the objective with respect to the raster mirror in a position parallel to YY', and the optical beam-bending system comprises a concave or "field" mirror having the plane P as the plane of symmetry, the apex of the mirror being near D on the ZZ' axis extending through D and perpendicular to YY', the mirror being so disposed that it conjugates the centre O of the exit pupil of the objective with a fixed point O' on the YY' axis, point O' being symmetrical with respect to ZZ" with the point where the optical axis of the objective intersects the YY' axis; in order, if required, to ensure that the idle scanning time between two consecutive lines is zero, the field mirror has also a width in the x direction which is slightly less than the length of the analyzed line, which in turn is equal to the distance between the images of the detector in two consecutive surfaces of the rotating drum, the mirror being moved if required for small distances in phase with the movement if the raster scanning means, the small motion comprising reciprocating rotation around an axis parallel to the x direction, which is symmetrical with respect to ZZ', the amplitude of the motion in translation being such as to correct the defocusing introduced by the raster scanning means and the amplitude of the rotation being such as to ensure that the field mirror holds the conjugate of the centre O of the exit pupil of the objective in a constant position O' during the reciprocating rotation of the raster scanning means.

According to the improvement of the device in the third certificate of addition, the motion of the raster mirror is specified in that its axis of rotation is no longer fixed and the raster mirror rotates in reciprocation while remaining at a tangent to a portion of a conic in the plane P, one focus of the conic being occupied by the centre of the objective exit pupil and the other by point D. In association with the aforementioned motion of the raster mirror, the motion of the field mirror is a reciprocating motion in rotation around an axis extending through D parallel to x, the rotation being synchronous with the motion of the raster mirror and such that the centre ray of the beam is reflected in a constant direction DO'.

In the device described in the aforementioned patent application and three certificates of addition, the image of the detector A is conveyed to A' on the drum axis of rotation YY' and the line scanned (in the direction x) is on a circle centred on YY' and is bounded on the circle by two images of A' in two consecutive surfaces of the drum. This feature, when a large number of points of analysis are required in the line, frequently means that the image conveying system has to operate with large apertures. Consequently, any spherical aberrations in the image conveying device must be thoroughly corrected. The device is therefore more difficult to construct, inter alia where the usage is conveyed by a lens objective which has to be given aspherical surfaces in order to correct these aberrations. The entire analysis system and the entrance objective must likewise have a wide aperture, and the aberrations therein must likewise be thoroughly corrected. In addition the permitted tolerance in the defocusing introduced by the raster scanning mirror is reduced owing to the aforementioned wide aperture, which makes it more difficult to coordinate the motion of the raster mirror and the field mirror in order to correct the effects of the aforementioned defocusing.

One object of the invention is to improve the device so that it can operate with smaller aperture in the line analysis system and the entrance objective. Another object of the invention is to permit operation with smaller apertures without reducing the resolution of the device. Thus, in this connection, the aim of the invention is to retain the same number of analysis points per scanning line for an analysis beam having a given geometrical size.

The invention proposes the optico-mechanical scanning device according to the parent patent and the three certificates of addition thereto with a new version of the line scanning means (in the x direction) and the means for conveying the image of the detector. As before, scanning is by means of a rotating drum having reflecting surfaces, but the detector image is not necessarily conveyed along the drum axis but outside the axis, inter alia at a more remote position in the optical system. The analyzed line is substantially an arc of a circle but its centre, which coincides with the centre of the entrance pupil of the line analysis system, is no longer on the drum axis of rotation but outside it, whereas the aperture of the analysis system is considerably reduced and the length of the analyzed line is increased so that, in the case of a system of analysis having a given geometrical size, the number of points of analysis in the line is preserved or actually increased, if the geometrical size is less. This structural feature of the line analysis system has the following result: The raster analysis system and the objective can be constructed with smaller aperture, e.g. F/4 instead of F/2 if F is the focal length of the objective, there is a wider tolerance in defects in the focusing of the raster mirror, and there is a smaller diffusion spot at the image formed on the detector.

The invention provides an image conveying system for embodying this novel method of line analysis, the image conveying system being introduced into opticomechanical scanning devices (or cameras) which are specially designed for vision in the infrared region. In addition, according to the invention, the objective part of the cameras is adapted to the novel method of line analysis and conveying the image.

The invention will be more clearly understood from the following description of some embodiments given by way of non-limitative examples. The description is accompanied by drawings in which.

Figure 1:
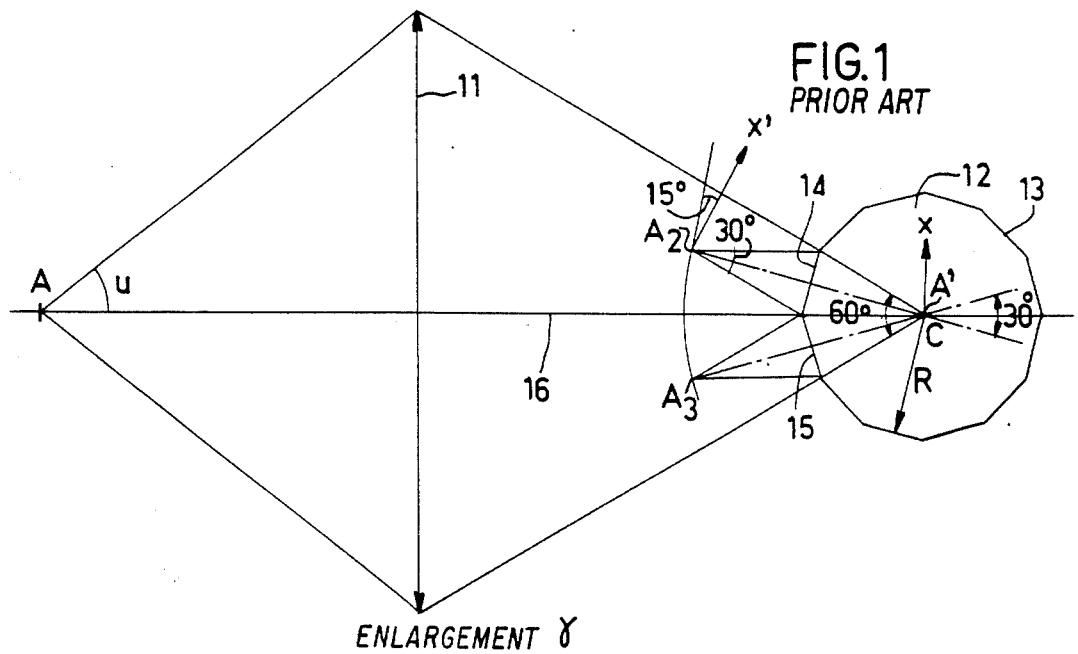
FIG. 1 is a diagram of an embodiment of the line analysis device according to the prior art.

FIG. 1 shows a system for conveying the image of a detector along the drum axis according to the prior art, i.e. patent application No. 3 370/76. The image conveying device is shown in section in a plane perpendicular to the drum axis. By way of example, the drum is assumed to be prismatic with a polygonal 12-sided outline. The optical conveying element is lens 11, whereas the drum reference is 12. Lens 11 gives an image $A'$ of detector $A$, the image being at the centre of polygon 13. $A_2$ and $A_3$ are the images of $A'$ in two consecutive surfaces 14, 15 of the drum when the surfaces are symmetrical with respect to axis 16 of the conveying optical system. The line analyzed (in the x direction) during the rotation of the drum is an arc of a circle $A_2A_3$ centred at C on the drum rotation axis of the centre of polygon 13. The magnification of the system is $\gamma$ and its geometrical size, on the detector side, corresponds to a useful-beam cone having an apex half-angle u.

Figure 2:
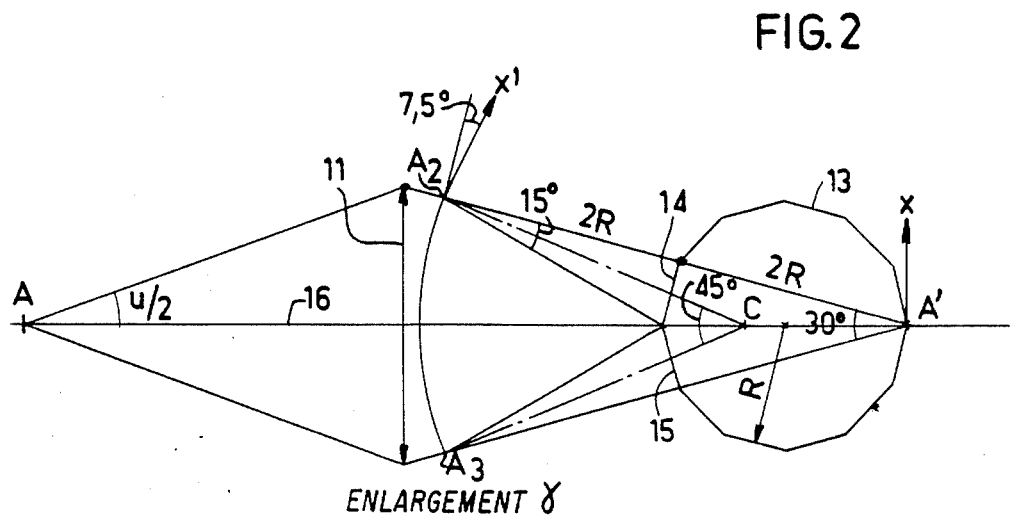
FIG. 2 is a diagram of a first embodiment of the line analysis device according to the invention.
Figure 3:
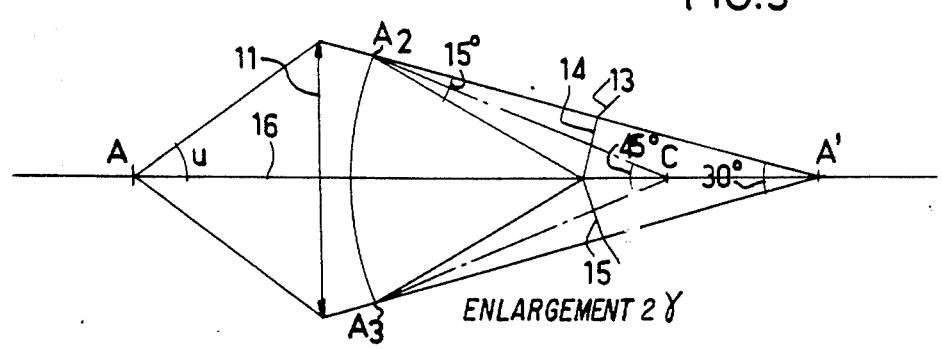
FIG. 3 is a diagram of a second embodiment of the line analysis device according to the invention.

FIGS. 2 and 3 each represent a system according to the invention for conveying the image of a detector having the same area as in FIG. 1. In FIGS. 2 and 3, like references denote the same conveying elements as in FIG. 1, but they operate differently and are differently disposed relative to one another. In FIG. 2, the system gives a magnification $\gamma$ and its geometrical size on the detector side corresponds to a half-angle u/2 at the apex of the useful-beam cone. The detector image is not conveyed to the centre of the polygon but to $A'$, e.g. on axis 16 at a distance R from the centre of the polygon on the opposite side from the active surfaces. The analyzed line $A_2A_3$ is substantially a portion of a circle (really a portion of a limacon) centred at C, a point which is no longer on the axis of rotation of drum 12 but at a distance less than the drum radius R from the active surfaces 14, 15 of the drum. In FIG. 3, the system has a magnification $2\gamma$ and an apex half-angle u. $A'$ and the centre C of the analyzed line are in positions similar to those in FIG. 2. The following table shows the features of the analysis obtained with the three systems, and shows the advantages of the invention.

TABLE

| Case of a drum with 12 surfaces | System in FIG. 1 | System in FIG. 2 | System in FIG. 3 |
|---|---|---|---|
| Image-conveying aperture on the side of detector A | u | u/2 | u |
| Image-conveying aperture on the side of image A' | 60° | 30° | 30° |
| Aperture of beam forming the image $A_2$ | 30° | 15° | 15° |
| Length of the analyzed line | 4R sin 15° | 8R sin 15° | 8R sin 15° |
| Angle between the direction X' and the tangent to the analyzed line | 15° | 7.5° | 7.5° |
| Angle at centre of the analyzed line | 30° | 45° | 45° |
| Number of points in the line | N | 2 N | N |

A comparison between the first and the second column shows how, according to the invention, the number of analyzed points per analyzed line can be increased while reducing the aperture of the analysis system (from 30° to 15°) and the geometrical size of the optical system. A comparison between the first and the third column shows that, if the analysis system has a given geometrical size, the number of analysis points per analyzed line can be maintained while reducing the aperture of the system of analysis (from 30° to 15°). The sixth line of the Table shows the angle between (a) the tangent to the analyzed line at its end $A_2$ and (b) the direction $X'$ of the image of the direction x of the detector, which is assumed to be linear in the aforementioned direction. As the table shows the last-mentioned angle is divided by two in the examples according to the invention, resulting in a four-fold reduction in the diffusion spot at the detector image on the analyzed line. The seventh line of the Table shows the angles at which the analysis line is viewed from point C. In the embodiments of the invention, the last-mentioned angle is increased from 30° to 45°, thus increasing the field of the device in the line direction. In general, in the novel method of line analysis, the performance of the device, inter alia its resolution, are at least preserved and sometimes improved, whereas the construction of the system is simpler owing to the smaller aperture of the optical elements, e.g. of the entrance objective, which can be F/4 instead of F/2, resulting in a four-fold increase in the permitted tolerance in the defocusing introduced by the raster mirror and simplifying the motion of the field mirror for correcting this defocusing.

In FIGS. 2 and 3, point A' is not necessarily at a distance R from the drum centre but at any distance. Consequently, drum 12 can be moved along axis 16 to increase or reduce the length of the analyzed line $A_2A_3$ and consequently increase or reduce the number of points of analysis. The line scanning efficiency is 100%, as in the parent patent. These remarks also apply to the embodiments of the invention described hereinafter.

As in the aforementioned patents and certificates of addition, the system of analysis according to the invention is designed in accordance with the other optical components of the total device in order to conjugate the centre of the exit pupil of the objective with a fixed point which is no longer on the drum axis but is still the point C, the centre of the entrance pupil of the line analysis system. In the case in FIGS. 2 and 3, point C is likewise the centre of curvature of the analyzed line.

Figure 4A:
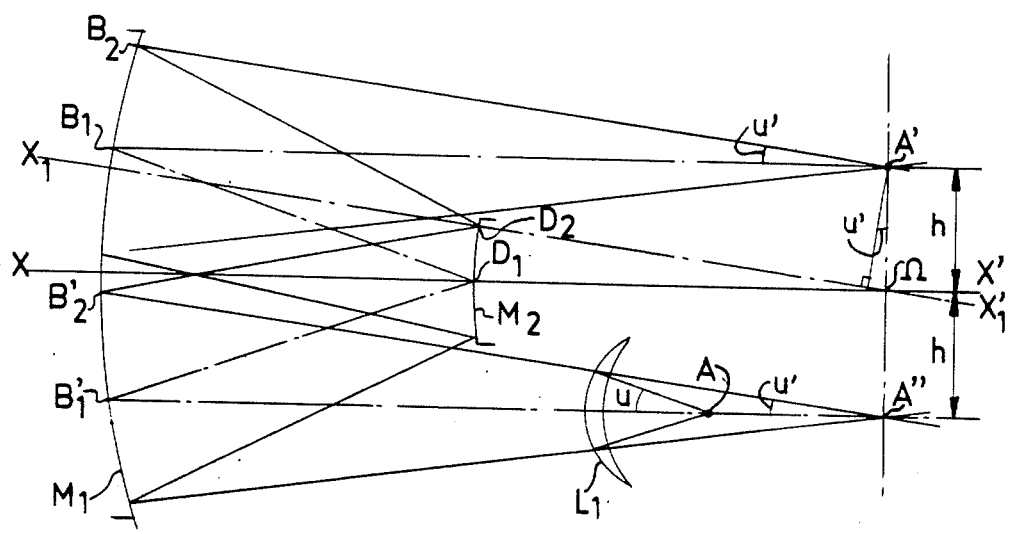
FIG. 4a is a diagram of an image conveying device in orthogonal projection along a first plane containing its axis of symmetry, the device being specially suited to the embodiments of the line analysis device in FIGS. 2 and 3.
Figure 4B:
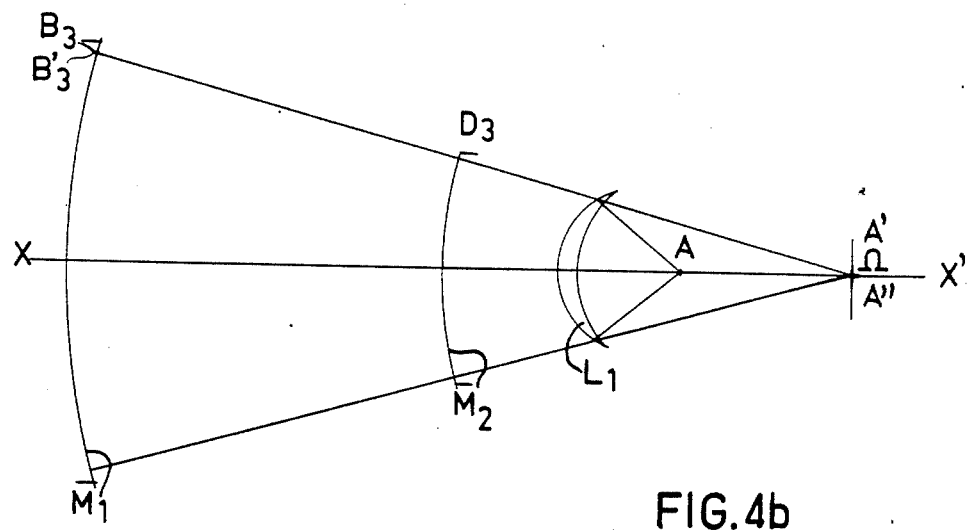
FIG. 4b is a diagram in projection of the last-mentioned image conveying device along a second plane perpendicular to the first and containing its axis of symmetry.

FIGS. 4a and 4b show an optical image-conveying device which is particularly adapted to the method of line scanning according to the invention as previously described. The conveying device, apart from lens $L_1$, the purpose of which is explained hereinafter, has an axis of symmetry XX'. In FIG. 4a the device is shown in orthogonal projection along a first plane extending through XX', i.e. the plane of symmetry of the total optico-mechanical scanning device (the plane P in the parent patent). In FIG. 4b the device is shown in projection along a second plane, which extends through XX' and is perpendicular to the first. The device is closely related to a Schmidt telescope, converted into a reflecting element by covering its focal surface with a spherical mirror. It comprises two spherical mirror portions $M_1$ and $M_2$ both having the centre $\Omega$ and radii $R_1$ and $R_2$ respectively, $M_1$ being concave and $M_2$ being concave and their surfaces facing one another. The length of the radii satisfy the following conditions: (1) $R_2 = h/\sin 2i$ (2) $\sin i = h/R_1$ (2), or, expressed otherwise (3) $(R_1/R_2)^2 = 4(1 - h^2/R_1^2)$, h being the distance between the centre $\Omega$ and the two points A' and A", which are symmetrical with respect to XX' and are in line with $\Omega$. If the aperture used is small—e.g. of the order of 10°—the device optically conjugates the points A' and A" as shown in FIGS. 4a and 4b, based on the optical paths and symmetry of the device. In FIG. 4a, ray A"B'$_1$ is parallel to XX' and, in accordance with relations (1) and (2), is reflected on mirror $M_2$ at $D_1$ on the axis of symmetry XX', and then at $B_1$ on mirror $M_1$, so that the optical paths A"B'$_1$D$_1$ and D$_1$B$_1$A' are equal and symmetrical with respect to XX'. Similarly, the ray A"B$_2$' parallel to any axis $X_1X_1'$, at a small angle u' to XX' and extending through $\Omega$, the centre of symmetry of the system, is reflected at $D_2$ on the mirror $M_2$ substantially on the $X_1X_1'$ axis, then at $B_2$ on mirror $M_1$, so that the optical paths A"B$_2$'D$_2$ and D$_2$B$_2$A' are equal and symmetrical relatively to $X_1X_1'$. In FIG. 4b, the projection of the system on the plane perpendicular to P extending through XX', the point $\Omega$ is again the centre of symmetry, so that in any plane perpendicular to the plane in FIG. 4b, an optical path such as A'B$_3$D$_3$B$_3$'A" has the same properties as the paths shown in FIG. 4a. The result is an excellent optical system of unit magnification between object A' and its image A" in the case of an aperture u' of the order of 10°; in addition, as we shall show, the system is aplanatic for points A' and A". According to the invention, the unit-magnification image conveying system is converted into a system having a magnification different from unity, e.g. by disposing the aplanatic lens $L_1$ on the axis $B_1'A''$. The lens, which has a refractive index n, forms an image A of A" with a magnification $$n = \frac{\sin u}{\sin u'},$$

u being the aperture of the beam on the side A. According to the invention, the detector is disposed at A if the magnification n is different from 1. More specifically, according to the invention the lens $L_1$ is made of materials having a high index and transparent to infrared. In practice, the detector image is conveyed from A to A' with a magnification from 1 to 4, for example, so that small detectors can be disposed at A and receive radiation over a very wide aperture angle u.

Figure 5:
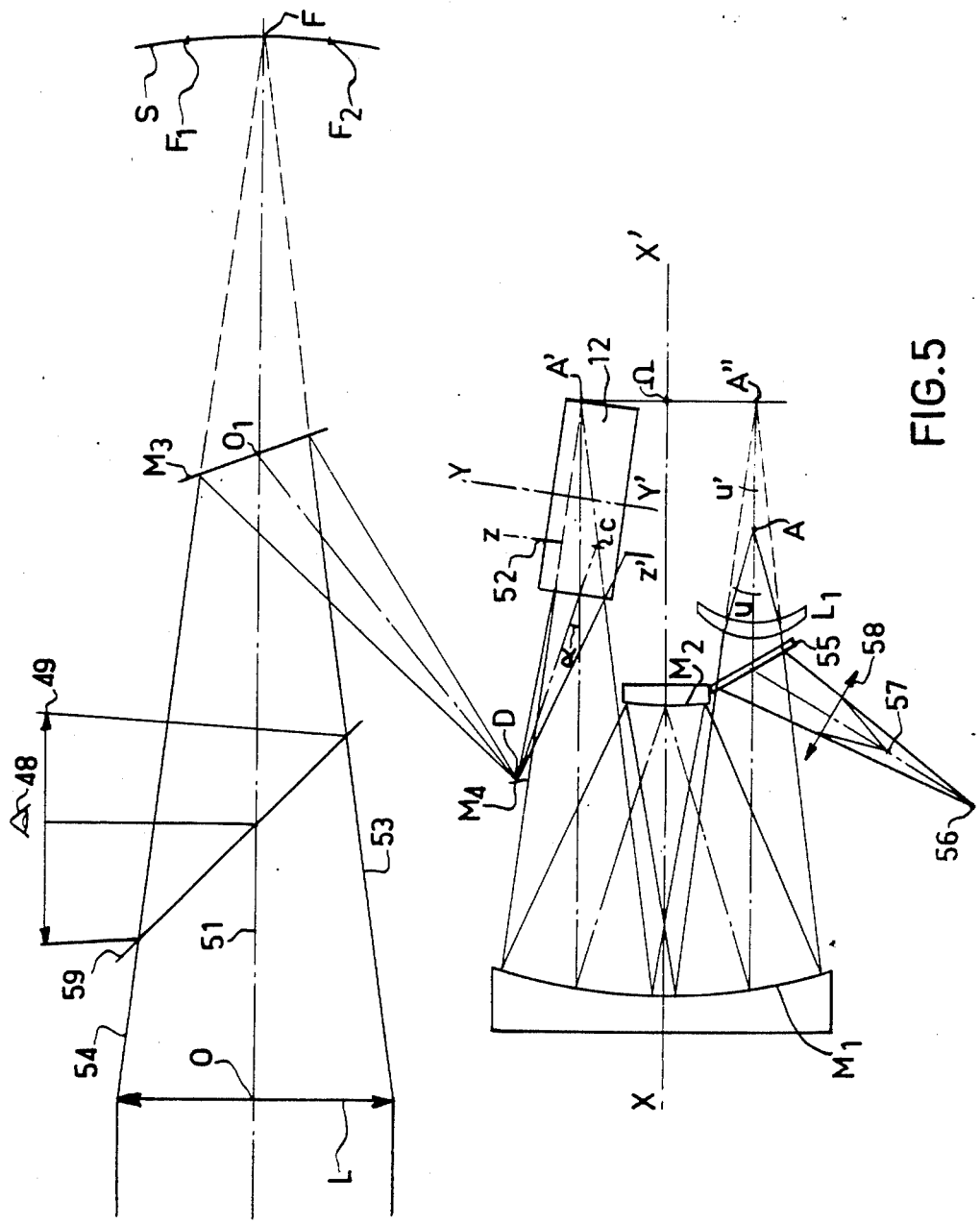
FIG. 5 shows a first embodiment of the opticomechanical scanning device (i.e. a camera) using a detector image conveying system according to FIGS. 4a and 4b.

FIG. 5 shows a first embodiment of the optico-mechanical scanning device (hereinafter called camera) provided with a detector image conveying system as previously described. An objective L on an axis 51 forms an image of the scene to be analyzed on its focal surface S having a centre of curvature (as stated in the aforementioned parent patent application and certificates of addition) at O, identical with the centre of the exit pupil of the objective. Mirror $M_3$ is used for vertical scanning (or raster scanning or y scanning). It can move over an ellipse having the foci O and D, the image of focus F of objective L in mirror $M_3$, or more simply it can rotate around an axis $O_1$ perpendicular to the plane of the drawing. The mirror forms successive images of points $F_1FF_2$ of the focal surface S on the field mirror $M_4$ at point D. The field mirror is spherical, so that the centre O of the exit pupil of objective L is conjugated with the centre C of the virtual entrance pupil 52 of the line analyzer in plane P on the zz' axis, which is fixed parallel to the axis YY' of rotation of the rotating drum 12, the reflecting surfaces of which are e.g. parallel to YY'. In order to maintain the conjugation when $M_3$ rotates around $O_1$, mirror $M_4$ rotates through an angle proportional to that of $M_3$ around an axis perpendicular to the plane of the drawing and extending through D. The line analysis image is conveyed in the same manner as in FIGS. 4a and 4b, using a lens $L_1$ and mirrors $M_1$ and $M_2$, which have a common centre $\Omega$. The device forms a fixed magnified image at A' of a detector placed at A and then, after reflection on the rotating drum, the device forms an image at D when the drum surface is perpendicular to the plane P of the drawing. When the drum rotates, the image describes an arc of a circle in the line scanning direction x, the arc being analogous to the arc $A_2A_3$ in FIGS. 1, 2 and 3 centred on the zz' axis. The arc is in a plane perpendicular to zz'. In order to illustrate the operation of the system, the Figure shows a beam having a main ray 51 and outer rays 54, 53 travelling all through the system, the beam converging at A on the detector. As described in the aforementioned patent application and certificates of addition, the field mirror $M_4$ serves two purposes, i.e. it conjugates the analysis line with the focal surface of the objective and it conjugates the exit pupil of the objective with the entrance pupil of the line analyzer.

The advantage of the novel system of analysis relative to those claimed in the aforementioned patents and certificates of addition are as follows:

When the camera has a given aperture angle (indicated at point A), the entire optical system of the camera, i.e. the objective, raster and line analyzer conveying means, operate with a reduced aperture U' (indicated at point A") except for the aplanatic lens $L_1$, which converts u' to u.

In practice, in an embodiment cited by way of example, the entire optical system can have an aperture of F/4 instead of F/2 without loss of photometric performance. On the other hand the objective has twice the focal length in order to maintain the diameter of the entrance pupil. The reduction in aperture greatly simplifies the construction of the optical system.

The image conveying system comprises only spherical surfaces, which are therefore easier to make.

The defocusing of the detector at the end of the analysis line is four times as small with regard to the diameter of the diffusion spot relative to the detector.

The defocusing tolerance at the fieldmirror is eight times as great, so that the motion of the raster analysis mirror $M_3$ can be simple rotation around a stationary axis, which results in a considerable mechanical simplification.

If it desired that the field mirror $M_4$ should be outside the beam converging at A', as shown in FIG. 5, the beam reflected by the drum is at an angle $\alpha$ to the incident direction (the angle between the indicated part and the reflecting part of ray 51 on surface 14 of the rotating drum). As a result of the reduction in angle $\alpha$, some distortions in line scannng can be reduced, which is all the easier in that aperture u' is smaller, since angle $\alpha$ is proportional to u'.

All the mechanical tolerances are divided in at least the ratio u/u'.

Finally, if the magnification of lens $L_1$ is changed without changing the aperture u' of the rest of the optical system, the total aperture u of the camera can be varied, thus varying the size of the image of the detector analyzing the image supplied by the objective. Since the analysis line has the same length as before, the number of points in the line can be increased or decreased at will, thus increasing or reducing the resolution of the camera, so that a single analyzer can be adapted to a number of applications, simply by modifying the lens $L_1$.

Figure 6:
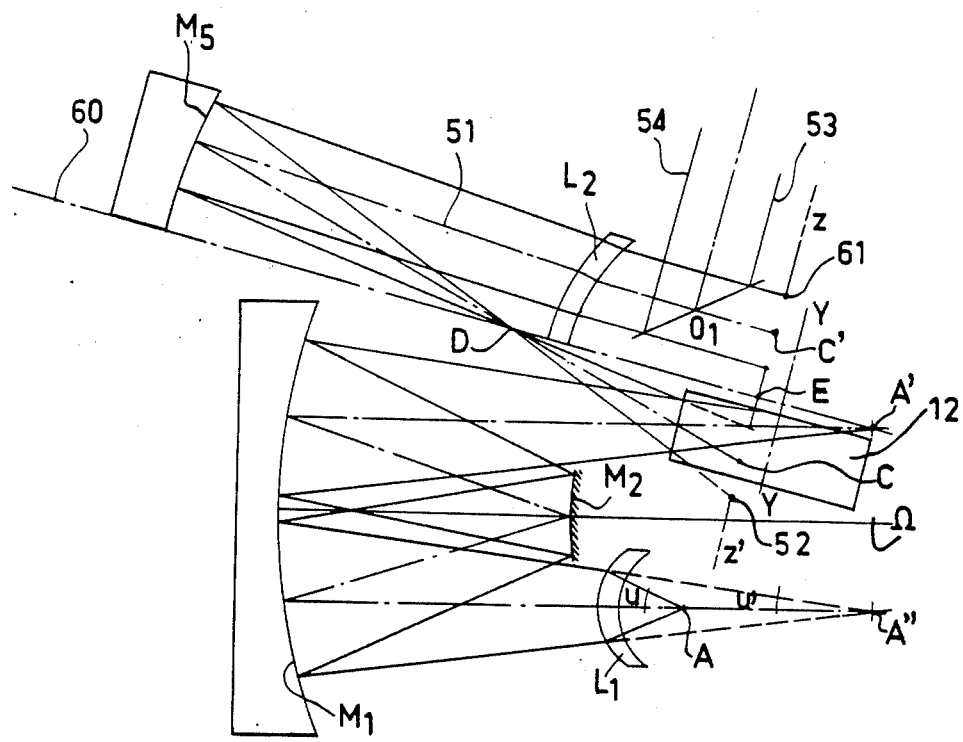
FIG. 6 shows a second embodiment of the opticomechanical scanning device using a detector image conveying system according to FIGS. 4a and 4b.

FIG. 6 is a section, through its plane of symmetry P, of a second embodiment of the camera using an image conveying system according to FIGS. 4a and 4b. The components of the line scanning device are given the same alphanumeric references as in FIG. 5. The camera is particularly suited to wide-field thermography. The objective is a reflecting Bouwers objective having an axis 60 and comprising a spherical mirror $M_5$ and a corrective lens $L_2$ made of a material transparent to infrared. The objective is used outside the axis. All the surfaces of the objective are centred at E on axis 60. The focal surface of the objective is also spherical and has the centre E. The centre E is in the plane of the entry pupil 52 (centre c) of the line analysis system at the intersection with A'D on zz' parallel to YY', which is also the plane of the entrance pupil 61 of the Bouwers objective whose centre C' is likewise on zz' and such that CE=C'E. The focal length of the objective is DE. Consequently, the focal surface of the objective exactly coincides with the line analyzed by the detector image in the surfaces of the rotating drum (line $A_2A_3$ in FIGS. 2 and 3).

Since the Bouwers objective conjugates centre C' of its entrance pupil with centre C of the entrance pupil of the system of analysis with unit magnification, the field mirror is unnecessary. Raster scanning can then be brought about by means of the mirror $M_3$ which rotates around an axis perpendicular to the plane of the drawing extending through $O_1$. The Bouwers-type objective provides excellent correction of aberrations. Its quality is constant irrespective of the field, since the system has the centre of symmetry E. In the case shown in FIG. 6, the line analysis system can be used to analyze a line viewed from the point C, the centre of the entrance pupil of the line analysis system, at an angle of 45° in the case of a drum having 12 surfaces (as shown in FIG. 2.). The camera can therefore have a field of 45° in the line direction. The raster field is not limited and depends on the mirror $M_3$. Mirror $M_3$ is disposed very near the entrance pupil 61 of centre C' of the objective, in order to reduce the mirror dimensions to a minimum. $O_1$ can be made identical with C' in order to place $M_3$ in the entrance pupil of the objective. The advantages of the system are the same as those of the system in FIG. 5. The wide-field system can be preceded, if required, by a non-focal dioptric or catadioptric system, provided that the exit pupil of the non-focal system coincides with the entrance pupil C' of the wide-field system. In this manner, the camera field can be reduced while increasing its angular resolution.

Figure 7A:
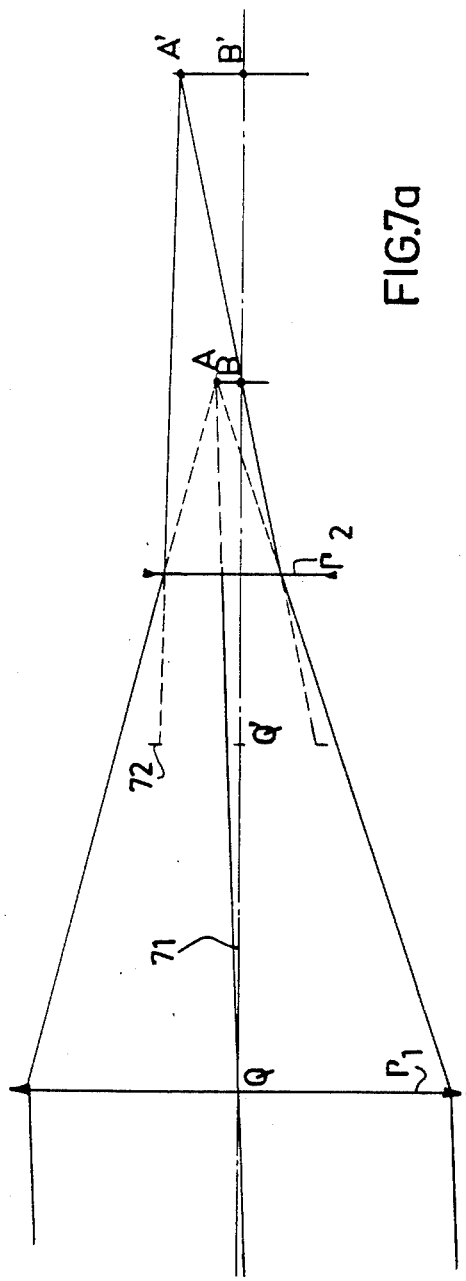
FIG. 7a is a diagram of the long focal-length part of an infrared objective suitable for the system of analysis according to the invention.
Figure 7B:
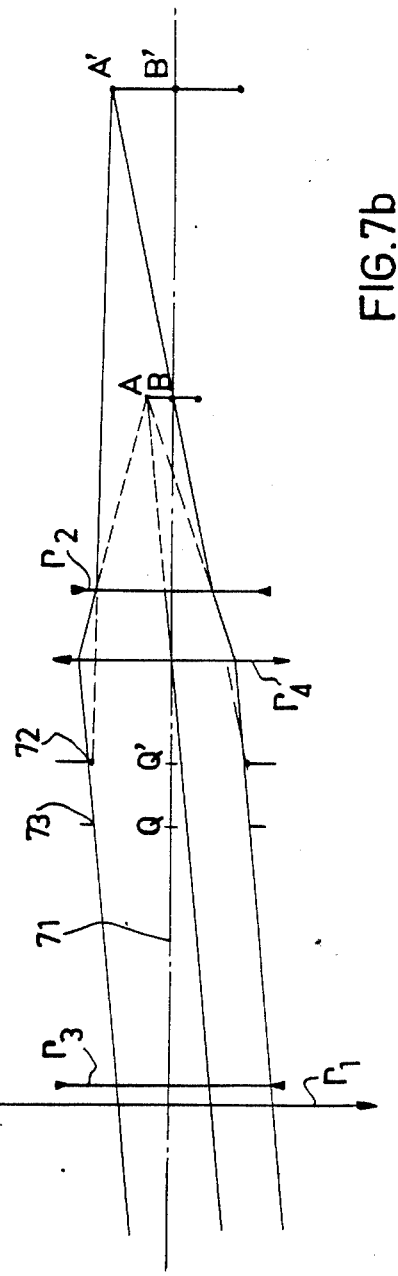
FIG. 7b is a diagram of the same objective comprising its short focal-length part.

FIGS. 7a and 7b are schematic diagrams of an infrared objective for a thermographic camera adapted to the line analysis system represented in FIGS. 4a, 4b and 5. If the objective is to be used in a thermographic camera and adapted to the analysis system, it must meet a number of conditions as follows:

The objective must usually be bifocal in order to give a fairly wide field of the scene to be recognized and a narrow field for identifying a detail. The ratio of the two focal lengths is usually of the order of 3.

The narrow field is frequently used for selecting fixed points of origin for vectors, and it is therefore essential that the long focal-length optical axis should be perfectly stable. The long focal-length optical components should be fixed.

In order to be well adapted to the analysis system, the focal surface must be curved. Its ideal radius is the distance $O_1D$ (FIG. 5) to ensure that the rotation of the raster scanning mierror $M_3$ does not result in defocusing. In practice, the radius of curvature can be 3 or 4 times $O_1D$ without defocusing causing trouble.

The exit pupil of the objective must extend near the centre of curvature of the focal surface so that the field mirror can simultaneously conjugate the images and pupils.

The bulk and mass of the device must always be at a minimum, and consequently the entrance pupil of the objective must be placed on the front lens.

Finally, the optical materials used for infrared have wide variations in refractive index in dependence on temperature. Consequently the position of the focal plane varies widely and the objective has to be refocused at each operating temperature. It is therefore desirable to be able to refocus the objective by means of a small optical element common to both focal lengths. The objective described in FIGS. 7a and 7b meets the aforementioned requirements. FIG. 7a is a diagram of the long focal-length part of the objective, in section through a plane extending through its optical axis 71. The structure is identical with the known "tele-objective" structure. It comprises a group of convergent lenses $\Gamma_1$ giving an image AB of the examined scene on its focal surface and a group of divergent lens $\Gamma_2$ forming an image A'B' of AB. The entrance pupil is identical with $\Gamma_1$ and its centre is Q; the exit pupil 72 has a centre Q'. This formula gives an exit pupil fairly near the focal surface of the objective. It can be seen from the design of the aforementioned objective that it is also possible to obtain a focal surface having a centre of curvature near Q'. With regard to the bulk, the total length of the objective is always less than its focal length. FIG. 7b is a diagram of the short focal-length objective in section through a plane extending through axis 71. Groups $\Gamma_1$, $\Gamma_2$ are combined with two additional groups $\Gamma_3$ and $\Gamma_4$. $\Gamma_3$ is divergent and has approximately the same power as $\Gamma_1$, so that the assembly $\Gamma_1\Gamma_3$ has practically zero power. Group $\Gamma_4$ is convergent and positioned so as to form an image of the examined scene in the plane of image A B in FIG. 7a. Since its focal length is e.g. about 3 times as small as that of $\Gamma_1$, the corresponding linear field A B is 3 times as wide for $\Gamma_4$ as for $\Gamma_1$. Group $\Gamma_2$ gives a magnified image A'B' identical with A'B' in FIG. 7a. The exit pupil is kept at Q', by suitably choosing the position of the entrance pupil 73 at Q. The ratio of the two focal lengths is equal to the ratio of the focal lengths of the convergent group $\Gamma_1$ and $\Gamma_4$. The focal length is easily switched over by inserting groups $\Gamma_3$ and $\Gamma_4$ or removing them from between groups $\Gamma_1$ and $\Gamma_2$. The long focal-length optical axis is kept stable since $\Gamma_1$ and $\Gamma_2$ are fixed. The objective can easily be refocused in dependence on temperature by moving $\Gamma_2$, in the case of both the long and the short focal lengths. Owing to the high magnification of $\Gamma_2$, a small movement can produce a larger displacement of image A'B'. Since the rear group $\Gamma_2$ is used for focusing, the objective can still be sealed by means of the fixed front group $\Gamma_1$. Another noteworthy feature is that the retractable assembly is not moved, either in whole or in part, parallel to the optical axis for refocusing. Since the diameter of lens $\Gamma_3\Gamma_4\Gamma_2$ is small, the bulk is reduced.

Of course, the devices according to the invention also comprise means for directly viewing the analyzed image, the means comprising an electroluminescent diode placed symmetrically with the detector with respect to a dichroic strip separating the visible from the infrared, as described in the aforementined prior-art patent application and certificates of addition.

In the systems in FIGS. 4a, 4b, 5 and 6, lens $L_1$ is transparent to infrared but not necessarily in the visible region. Accordingly, it will be advantageous to dispose a separating strips 55 and an electroluminescent diode 56 as in FIG. 5, the diode being either symmetrical with A" with respect to 55 and having the same dimensions as A", or at 57 in front of a lens 58 so that the image of 57 in lens 58 is identical with 56 in dimensions and size. In the latter case, a dichroic strip 59 and an objective 49 will of course be placed in the beam, the eye being placed at 48.

What I claim is:

1. In a device for optically scanning a field of vision divided into different regions and for displaying the field, scanning being done in two perpendicular directions, i.e. "line" scanning in a direction x and "raster" or "image" scanning in a direction y, the device scanning along beams coming from different regions of the field and causing the beams to converge on to an element sensitive to the radiation in the beams, the device substantially comprising the following components in order, in the direction of the path of the central incident beam from the field of vision: an objective, means for raster scanning in the y direction, and a system for bending the beams bounded by the sensitive element and the aperture of the objective towards means for line scanning of the image field of the objective in the x direction, the line scanning means, the sensitive element and any other elements co-operating with the previously-mentioned elements being used for direct display of the image of the analyzed field, the improvement being that (a) the optical axis of the objective is in a plane P containing the y direction and perpendicular to x, the focal surface of the objective being spherical and such that its centre of curvature is at the centre of the exit pupil of the objective;

(b) the raster scanning means comprise a plane (or "raster") mirror rotating in reciprocation around an axis parallel to the x direction and disposed in a convergent beam behind the objective near the field image in the objective;

(c) the line scanning means comprise, firstly, a drum rotating uniformly around a stationary axis YY' contained in the plane P and bearing a large number of flat reflecting surfaces regularly distributed on the drum periphery, the surfaces having different inclinations relative to the axis of rotation and, secondly, an image-conveying means symmetrical with respect to the plane P and forming an image of the sensitive element at a fixed point A' on the plane P outside the axis of rotation of the drum, the drum being placed in a convergent beam in the path of the conveying system on the image side of the sensitive element, the point symmetrical with the point A' with respect to each surface of the drum, when the surface is perpendicular to the plane P, being at a point D in the immediate neighbourhood of the point symmetrical with the focus with the objective relative to the raster mirror in the position parallel to YY', and (d) the optical beam-bending system of the beams comprises a concave or "field" mirror having the plane P as the plane of symmetry, the apex of the mirror being substantially at the point D, the mirror being so disposed that, in conjunction with the raster mirror, it conjugates the centre O of the exit pupil of the objective with a fixed point C on the plane P, i.e. the centre of the entrance pupil of the line scanning means; in order to ensure that the idle scanning time between two consecutive lines is zero, the field mirror also has a width in the x direction which is slightly less than the length of the analyzed line, which in turn is equal to the distance between the images of the detector in two consecutive surfaces of the rotating drum, the mirror being reciprocated for small distances in phase with the movement of the raster scanning means in order to maintain the optical conjugation of O and C.

2. A device as defined in claim 1, wherein the system for conveying the image of the sensitive element belonging to the line scanning means comprises two spherical mirrors having the same centre $\Omega$, i.e. a first concave mirror $M_1$ having a radius $R_1$ and a second convex mirror $M_2$ having a radius $R_2$, the two mirrors having the same axis of symmetry XX', their radius $R_1$ and $R_2$ satisfying the relation:

$$\left(\frac{R_1}{R_2}\right)^2 = 4\left(1 - \frac{h^2}{R_1^2}\right),$$

where h denotes the distance of A' from XX', the reflecting surface of one mirror facing the reflecting surface of the other mirror, the set of two mirrors providing unit magnification and optically conjugating the points A' with a point A", A and A" being symmetrical with respect to XX' and aligned with $\Omega$.

3. A device as defined in claim 2, wherein the sensitive element is disposed at the point A".

4. A device as defined in claim 3, wherein the system for conveying the image of the sensitive element in the line scanning means also comprises an optical element for conveying the image of the sensitive element to the point A", the optical element giving a magnification different from 1.

5. A device as defined in claim 4, wherein the optical element is an aplanatic lens having an optical axis parallel to XX' and passing through A".

6. A device as defined in claim 2, wherein the plane raster mirror rotates around a fixed axis perpendicular to plane P and intersecting the optical axis of the objective so as to form, at point D, the image of points on the focal surface of the objective corresponding to various directions of the centre ray of the beam and in that the field mirror is spherical having an apex D and is driven around an axis perpendicular to P at the point D, the mirror being rotated through an angle proportional to the angle of the raster mirror in order to maintain the optical conjugation between the centre of the objective exit pupil and the centre C of the line analyzer entrance pupil.

7. A device as defined in claim 6, wherein the sensitive element is disposed at the point A".

8. A device as defined in claim 6, wherein the system for conveying the image of the sensitive element in the line scanning means also comprises an optical element for conveying the image of the sensitive element to the point A", the optical element giving a magnification different from 1.

9. A device as defined in claim 6, wherein the optical element is an aplanatic lens having an optical axis parallel to XX' and passing through A".

10. A device as defined in claim 2, wherein the objective is a catadioptric Bouwers objective and comprises a spherical mirror and a lens made of material transparent to infrared, the mirror and the lens surfaces being concentric at a point E on A'D in the plane of the entrance pupil of the line analyzer, the focal length of the objective being equal to DE; the raster mirror rotates around a stationary axis perpendicular to P and intersecting the optical axis of the objective, the raster mirror being disposed very near the entrance pupil of the objective.

11. A device as defined in claim 10, wherein the place where the axis of rotation of the raster mirror intersects the optical axis of the objective coincides with the centre C' of the aforementioned entrance pupil of the objective.

12. A device as defined in claim 10, wherein the analyzed line is viewed from point C at an angle of approximately 45°.

13. A device as defined in claim 10, wherein the sensitive element is disposed at the point A".

14. A device as defined in claim 10, wherein the system for conveying the image of the sensitive element in the line scanning means also comprises an optical element for conveying the image of the sensitive element to the point A", the optical element giving a magnification different from 1.

15. A device as defined in claim 10, wherein the optical element is an aplanatic lens having an optical axis parallel to XX' and passing through A".

16. A device as defined in claim 11, wherein the analyzed line is viewed from point C at an angle of approximately 45°.

17. A device as defined in claim 2, wherein the objective is of the bifocal kind transparent to infrared light, i.e. it comprises a first part having a long focal length and a second part which, in conjunction with the first part, gives the objective a short focal length, the first part being of the tele-objective kind and comprising a convergent group $\Gamma_1$ and a divergent group $\Gamma_2$ wherein the centre Q' of the exit pupil is between the groups $\Gamma_1$ and $\Gamma_2$, the centre of the focal surface of the assembly comprising the two groups being near Q', the second part comprising a divergent group $\Gamma_3$ between $\Gamma_1$ and $\Gamma_2$ and disposed relative to $\Gamma_1$ and having a power such that the assembly $\Gamma_1 \Gamma_3$ has a power of approximately zero, the device also comprising a group $\Gamma_4$ having a position and power such that the assembly $\Gamma_1\Gamma_2\Gamma_4$ has substantially the same focal surface as $\Gamma_1$ and the exit pupil is in the presence of the groups $\Gamma_3$ and $\Gamma_4$ and maintained at Q' with the same dimensions, the set of groups $\Gamma_3\Gamma_4$ are retractable from the device and the group $\Gamma_2$ comprises means for moving it in translation along its optical axis in order to refocus the objective if it needs adjustment, inter alia as a result of variations in the operating temperature.

18. A device as defined in claim 17, wherein the sensitive element is disposed at the point A".

19. A device as defined in claim 17, wherein the system for conveying the image of the sensitive element in the line scanning means also comprises an optical element for conveying the image of the sensitive element to the point A", the optical element giving a magnification different from 1.

20. A device as defined in claim 17, wherein the optical element is an aplanatic lens having an optical axis parallel to XX' and passing through A".

* * * * *